(12) United States Patent
Avramidis et al.

(10) Patent No.: US 6,329,447 B1
(45) Date of Patent: Dec. 11, 2001

(54) ETHYLENE LATEX COPOLYMER COMPOSITIONS

(75) Inventors: Kostas S Avramidis, Apex; David R Bassett, Cary, both of NC (US); Richard D. Jenkins; Chee B Tan, both of Singapore (SG)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 09/463,371

(22) PCT Filed: May 21, 1999

(86) PCT No.: PCT/US99/11286
  § 371 Date: Jan. 21, 2000
  § 102(e) Date: Jan. 21, 2000

(87) PCT Pub. No.: WO99/61496
  PCT Pub. Date: Dec. 2, 1999

Related U.S. Application Data

(60) Provisional application No. 60/086,417, filed on May 22, 1998.

(51) Int. Cl.$^7$ ........................................ C08L 83/00
(52) U.S. Cl. ............................................. 523/201; 525/311
(58) Field of Search ................................. 523/201

(56) References Cited

U.S. PATENT DOCUMENTS

| | | | |
|---|---|---|---|
| 3,644,262 | 2/1972 | Stehle et al. | 260/29.6 |
| 3,661,696 | 5/1972 | Knutson | 161/204 |
| 3,804,881 | 4/1974 | Bassett et al. | 260/470 A |
| 4,164,489 | 8/1979 | Daniels et al. | 260/29.6 |

FOREIGN PATENT DOCUMENTS

| | | |
|---|---|---|
| A0295727 | 9/1988 | (EP) . |

Primary Examiner—Paul R. Michl
(74) Attorney, Agent, or Firm—Edward W. Black

(57) ABSTRACT

An alkene copolymer latex composition comprising,
(i) an inner particulate material;
(ii) an outer copolymer copolymerized from an alkene, a lower vinyl ester and optionally additional monomers, said outer copolymer at least partially encapsulating said inner particulate material; wherein the inner particulate material is effective to enhance the incorporation of the alkene into the copolymer composition; and
(iii) water.

35 Claims, No Drawings

ETHYLENE LATEX COPOLYMER COMPOSITIONS

This application claims the benefit of provisional application 60/086,417 filed May 22, 1998.

FIELD OF THE INVENTION

The present invention relates to alkene latex copolymer compositions and processes for producing the copolymer compositions whereby enhanced incorporation of the alkene, e.g., ethylene, can be achieved at low reaction pressures, e.g., 4 million pascals ("MPa").

BACKGROUND OF THE INVENTION

Latex paint coatings are typically applied to substrates and dried to form continuous films for decorative purposes as well as to protect the substrate. Such paint coatings are often applied to architectural interior or exterior surfaces, where the coatings are sufficiently fluid to flow out, form a continuous paint film, and dry at ambient temperatures.

A latex paint ordinarily comprises an organic polymeric binder, i.e., latex, pigments, and various paint additives. In dried paint films, the polymeric binder functions as a binder for the pigments and provides adhesion of the dried paint film to the substrate. The pigments may be organic or inorganic and functionally contribute to opacity and color in addition to durability and hardness, although some paints contain little or no opacifying pigments and are described as clear coatings. The manufacture of paints involves the preparation of a polymeric binder, mixing of component materials, grinding of pigments in a dispersant medium, and thinning to commercial standards.

Two types of copolymers commonly used in formulating latex paints include: (i) an all acrylic system, e.g., copolymers of methyl methacrylate, butyl acrylate or 2-ethylhexyl acrylate with small amounts of functional monomers, such as, carboxylic acids; and (ii) vinyl acetate-based copolymers usually in combination with a small proportion of the above-mentioned lower alkyl acrylates, such as, for example, butyl acrylates. Because of its low cost, vinyl acetate is an attractive alternative to certain acrylate monomers, e.g., methyl methacrylate, for use in architectural coating latexes. Unfortunately, vinyl acetate suffers from poor hydrolytic stability especially under alkaline conditions and accordingly, finds only limited application in exterior coatings. Alkali resistance is extremely important, for example, when paints are applied over an alkaline construction material, such as, for example, cement.

Ethylene is a desirable comonomer for polymerization with vinyl acetate to form latexes because ethylene has properties which can compensate for the shortcomings of vinyl acetate. More specifically, because of ethylene's low molecular weight, it permits a high level of introduction of non-hydrolyzable segments on a per weight basis which can improve the hydrolytic stability properties of the vinyl acetate copolymer. Stated another way, the hydrocarbon segments provided by the ethylene tend to reduce water solubility, thus imparting greater hydrolytic stability. Moreover, ethylene has a low glass transition temperature which can provide enhanced copolymer hydrophobicity and enhanced water and alkali resistance.

However, ethylene is a gas at normal temperatures and pressures and does not readily react with vinyl acetate unless at elevated pressures. The reaction normally requires special reactors with suitable wall thicknesses, pressure resistant seals and valves and other apparatus which are not necessary in conventional emulsion polymerization. Therefore, plant costs are often significantly higher for polymerizations involving ethylene than for conventional latex polymerization processes. As a result, the benefits expected from the use of ethylene can be offset or nullified by the high costs associated with using ethylene.

Accordingly, new latex copolymer compositions based on the use of alkenes, e.g., ethylene, as comonomers are desired which do not require high pressure apparatus commonly associated with the polymerization of alkene copolymers. Desirably, such compositions would have utility in a variety of applications, particularly for use as latex paints. Also, efficient processes for the production of such latex copolymers are desired which can provide enhanced levels of alkene incorporation at a given reaction pressure.

SUMMARY OF THE INVENTION

By the present invention, alkene latex copolymers are provided which are suitable for use as latex paints as well as in other applications where latex copolymers may be used.

The alkene latex copolymer compositions comprise an inner particulate material and an outer copolymer copolymerized from the alkene and other monomer(s). Lower vinyl esters, e.g., vinyl acetate, are used as comonomers with the alkenes in order to provide the latex copolymer composition with desirable properties.

Quite surprisingly in accordance with the present invention, it has been found that the presence of the inner particulate material can enhance the incorporation of the alkene into the latex copolymer. As a result, it is now possible to prepare alkene latex copolymer compositions at significantly lower pressures than previously efficiently possible, e.g., typically about 4 MPa and often to as low as about 0.2 MPa.

In addition, the present invention provides improved processes for the production of the alkene latex copolymers. In one aspect of the invention, the process comprises introducing the inner particulate material to a reaction zone either prior to or during the introduction of an alkene monomer, e.g., ethylene, and a lower vinyl ester monomer, e.g., vinyl acetate, and optionally other monomers, e.g., higher vinyl esters, such as, for example, vinyl neodecanoate. In another aspect of the invention, the process involves a polymerization of at least one vapor monomer, e.g., ethylene, and at least two liquid monomers, e.g., vinyl acetate and vinyl neodecanoate, wherein the two liquid monomers are introduced to the reaction zone at feed rates which are varied in a manner effective to enhance the incorporation of the vapor monomer into the latex copolymer.

DETAILED DESCRIPTION OF INVENTION

The alkene monomers suitable use in accordance with the present invention comprise unsaturated hydrocarbons, e.g., olefins, typically having from 2 to about 12, preferably 2 to about 8 and more preferably from 2 to about 6 carbon atoms per molecule. The alkenes may have a straight chain structure, branched chain structure or a cyclic structure and may, or may not, by hetereogeneous, e.g., contain oxygen, nitrogen or sulfur. Often, the alkene monomers are vapor monomers. The vapor monomers suitable for use in accordance with the present invention include all monomers which exist in a vapor state at standard temperature and pressure, e.g., 0.1 MPa at 25° C. Preferred vapor monomers include lower alkene monomers, e.g., ethylene, propylene and butylene. Other suitable vapor monomers include vinyl halides, e.g., vinyl chloride, vinyl bromide and vinyl fluoride and suitable aliphatic conjugated dienes, such as 1,3 butadiene and butadiene monomers, such as methyl-2-butadiene, 2,3-dimethyl butadiene, blends of the diene monomers and the like. In one aspect of the invention, an ethylene-propylene monomer mixture is used but different vapor monomer combinations can be used as desired in order to achieve desired copolymer properties, such as Tg, for example. The amount of the alkene monomers used in the latex copolymer compositions of the present invention is from about 0.5 to 95 wt. %, preferably from about 0.5 to 60 wt. % and more preferably from about 2 to 40 wt.%, based upon the total weight of the outer copolymer; that is, the total weight of monomers used to make the outer copolymer, exclusive of the inner particulate material when used. For instance, if the inner particulate material is a vinyl acetate copolymer having a total weight of 5 grams, the outer copolymer contains 20 grams of vinyl acetate, and the total weight of the monomers used to make the outer copolymer is 100 grams, then the concentration of vinyl acetate is 20 weight percent. Suitable alkene monomers for use in accordance with the present invention are commercially available.

The lower vinyl esters suitable for use in accordance with the present invention include all lower vinyl esters having from about 2 to 4 carbon atoms in the acid moiety. Preferred lower vinyl esters include, for example, vinyl acetate, vinyl isopropyl acetate, vinyl propionate and vinyl butyrate. The amount of the lower vinyl esters is typically from about 0.1 to 95 wt. %, preferably from about 10 to 90 wt. % and more preferably from about 20 to 85 wt. %, based on the total weight of the outer copolymer. Suitable lower vinyl esters for use in accordance with the present invention are commercially available.

The additional monomers suitable for use in accordance with the present invention include any monomers which can impart the desired characteristics to the latex copolymer compositions. Typical additional monomers are selected from the group consisting of higher vinyl esters, e.g., those containing from about 5 to 12 carbon atoms in the acid moiety, vinyl aromatic hydrocarbons, vinyl aliphatic hydrocarbons, vinyl alkyl ethers, acrylic monomers, allylic monomers, and mixtures thereof.

Representative vinyl monomers include vinyl esters, such as, for example, vinyl laurate, vinyl decanoate, vinyl benzoates, and similar vinyl esters; vinyl aromatic hydrocarbons, such as, for example, styrene, methyl styrenes and similar lower alkyl styrenes, chlorostyrene, vinyl toluene, vinyl naphthalene and divinyl benzene; vinyl aliphatic hydrocarbon monomers, such as, for example, vinylidene chloride as well as alpha olefins such as, for example, 1,3 butadiene, methyl-2-butadiene, 1,3-piperylene, 2,3-dimethyl butadiene, isoprene, cyclohexane, cyclopentadiene, and dicyclopentadiene; and vinyl alkyl ethers, such as, for example, methyl vinyl ether, isopropyl vinyl ether, n-butyl vinyl ether, and isobutyl vinyl ether.

Representative acrylic monomers include any compounds having acrylic functionality. Preferred acrylic monomers are selected from the group consisting of alkyl acrylates, alkyl methacrylates, acrylate acids and methacrylate acids as well as aromatic derivatives of acrylic and methacrylic acid, acrylamides and acrylonitrile. Typically, the alkyl acrylate and methacrylic monomers (also referred to herein as "alkyl esters of acrylic or methacrylic acid") will have an alkyl ester portion containing from 1 to about 12, preferably about 1 to 5, carbon atoms per molecule. Examples include methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecyl acrylate and methacrylate, benzyl acrylate and methacrylate, and various reaction products such as butyl, phenyl, and cresyl glycidyl ethers reacted with acrylic and methacrylic acids, hydroxyl alkyl acrylates and methacrylates such as hydroxyethyl and hydroxypropyl acrylates and methacrylates, amino acrylates, methacrylates as well as acrylic acids such as acrylic and methacrylic acid, ethacrylic acid, alpha-chloroacrylic acid, alpha-cycanoacrylic acid, crotonic acid, beta-acryloxy propionic acid, and beta-styrl acrylic acid.

Higher vinyl esters are preferred for use as additional monomers in accordance with the present invention. More preferably, the higher vinyl esters are branched vinyl esters. Preferred branched vinyl ester monomers are selected from the group consisting of vinyl pivalate, vinyl neo-nonanoate, 2-ethyl hexanoate, vinyl neo-decanoate, vinyl neo-endecanoate, vinyl neo-dodecanoate and mixtures thereof.

It has been found that use of higher branched vinyl esters can provide enhanced incorporation of the alkene in the latex copolymer compositions of the present invention. For example, the enhanced incorporation of the alkene can permit the latex copolymer compositions as disclosed herein to be made at as low pressures as 0.2 MPa. In this aspect of the invention, the term "Alkene Incorporation Enhancement" means for a given set of reaction conditions, the amount of additional alkene incorporated into the latex copolymer composition as compared to the amount of alkene incorporated into the latex copolymer composition without the presence of the higher branched ester monomer. For example, if 110 grams of ethylene were incorporated into the latex copolymer composition by utilizing the branched vinyl ester and 100 grams of ethylene were incorporated into the latex copolymer composition without using the branched vinyl ester, then the alkene incorporation enhancement would be (110−100)/100=10%. Alternatively, the Alkene Incorporation Enhancement can be calculated based on the percentage of alkene in the respective products. Typically, the Alkene Incorporation Enhancement, at a given pressure associated with utilizing a branched vinyl ester in accordance with the present invention is at least 5 percent, preferably at least 10 percent, more preferably at least 30 percent and most preferably at least 50 percent.

Without being bound to any particular theory, it is believed that the effect of branched esters on ethylene uptake is rooted on two factors: (i) on the hydrophobicity of such monomers that help drive the ethylene through the aqueous/monomer phase to the polymerization loci, i.e., minimizing the liquid phase resistance to ethylene transport; and (ii) on the reactivity ratio of such branched esters with ethylene and vinyl acetate which is close to (i), e.g., from about 0.9 to 1.1, suggesting random copolymerization. The hydrophobic carriers, e.g., branched ester, of ethylene to the reaction sites should also be easily copolymerizable with vinyl acetate and with ethylene in the presence of an initiator in order to help establish and sustain a concentration gradient of ethylene from the ethylene source to the particles, and, therefore, result in ethylene incorporation in the copolymer. In addition to the branched esters, system variables such as pressure, temperature and composition also affect ethylene transport to the particles. Also, surface active agents that are capable of transporting ethylene to the polymerization sites can be used. These carriers are especially important because they offer both a hydrophobic and hydrophilic portion, and as such can help solubilize and transport ethylene to the particles.

Branched esters are the most hydrophobic of the usual monomers employed in emulsion polymerization and, most importantly, their reactivity ratio with both vinyl acetate and ethylene is fully and uniquely supporting the production of random ethylene-vinyl acetate-vinyl branched ester copolymers. Table 1 lists the water solubility of different monomers and Table 2 lists the reactivity ratios of common monomers with vinyl acetate. Although styrene is the next most hydrophobic monomer to the branched ester, its reactivity with vinyl acetate does not allow for random copolymerization, or indeed copolymerization with vinyl acetate is very difficult.

TABLE 1

Water Solubility of Monomers at 20 C[1]

| Monomer | Solubility (g/100 g) |
|---|---|
| Styrene* | 0.032 |
| Vinyl Acetate | 2 |
| Butyl Acrylate | 0.16 |
| Vinyl neo-decanoate | <0.01 |
| Ethylene** | 0.8–1.6 |

*at 25° C.
**at the saturation vapor pressure corresponding to 20° C.
[1]From "Emulsion Polymerization and Emulsion Copolymers," G.V. Vandezande, O.W. Smith and D.R. Bassett, "Vinyl Acetate Polymerization" in "Emulsion Polymerization and Emulsion Copolymers" Peter A. Lovell and Mohamad S. El-Aasser, edits., pg. 582, John Willey & Sons, 1997.

TABLE 2

Calculated monomer reactivity ratios for copolymerization with vinyl acetate[2]

| Second Monomer | r1 | r2 |
|---|---|---|
| Vinyl neo-decanoate | 0.99 | 0.92 |
| Ethylene | 1 | 1 |
| Butyl Acrylate | 0.05 | 5.89 |
| Styrene | 0.01 | 56 |

The amount of the additional monomers used in accordance with the present invention typically is from about 0.1 to 99.5 wt. %, preferably from about 2 to 90 wt. % and more preferably from about 3 to 80 wt. % based on the total weight of the outer copolymer. Suitable additional monomers for use in accordance with the present invention are commercially available.

The inner particulate materials suitable for use in accordance with the present invention include any particulate materials with which the monomers which comprise the outer copolymer can be polymerized. In one aspect of the invention, the inner particulate material is a copolymer, such as, for example, a copolymer polymerized from one or more of the above described monomers, e.g., ethylene, vinyl acetate and vinyl neodecanoate. Examples of other suitable inner particulate materials include poly(vinyl acetate), poly (butyl acrylate), poly(methyl methacrylate), poly(vinyl neodecanoate), polystyrene and copolymers, copolymers or blends thereof .

In the aspect of the invention wherein the inner particulate material is a copolymer, the molecular weight of the inner particulate material is typically from about 20,000 to 500,000 grams per gram mole ("g/gmole") and in some cases the inner particulate material can be a crosslinked polymer. As used herein, the term "molecular weight" means weight average molecular weight. Techniques for determining weight average molecular weight are known to those skilled in the art. One such technique is, for example, gel permeation chromatography. The particle size of the inner particulate material is not critical to the present invention. Preferably, the inner particulate material has a particle size of from about 0.005 to 2.0, more preferably from about 0.005 to 0.5, most preferably from about 0.01 to 0.2 microns.

Typically, the outer copolymer which is polymerized from the above-mentioned monomers at least partially encapsulates the inner particulate material. Preferably, the outer copolymer encapsulates at least 50 percent, more preferably at lest 80 percent and most preferably at least 90 percent of the inner particulate material. Typical latex compositions in accordance with the present invention comprise from about 0.01 to 5.0 weight percent, preferably from about 0.1 to 2.0 weight percent and more preferably from about 0.2 to 1.0 weight percent of the inner particulate material and from about 95 to 99.99 weight percent, preferably from about 98 to 99.9 weight percent and more preferably from about 99.0 to 99.8 weight percent of the outer copolymer based on the total weight of the, outer copolymer plus inner particulate material.

Quite surprisingly, it is has been found in accordance with the present invention that the presence of the inner particulate material can enhance the incorporation of the alkene monomer. Typically, the Alkene Incorporation Enhancement associated with the use of the inner particulate material is at least 5 percent, preferably at least 10 percent, more preferably at least 30 percent and most preferably at least 50 percent. In this aspect of the invention, the Alkene Incorporation Enhancement is calculated as described above on the basis of comparing the amount of the alkene, e.g., ethylene, incorporated into the copolymer as a result of the inner particulate material with the amount of alkene incorporated into the copolymer without the use of the inner particulate material.

Quite surprisingly, the alkene latex copolymer compositions of the present invention have a very uniform particle size distribution. More specifically, the particle size polydispersity of the latex copolymer compositions of the present invention is typically from about 1.0 to 1.4, preferably from about 1.0 to 1.3 and more preferably from about 1.0 to 1.2. As used herein, the term "particle size polydispersity" means the ratio of the volume-average particle size to the number-average particle size.

The molecular weight of the latex copolymer compositions of the present invention, is typically from about 20,000 to 200,000, preferably from about 150,000 to 500,000 and more preferably from about 500,000 to 1,500,000 g/gmole. In some aspects of the invention, the inner particulate material or the outer copolymer or both may be crosslinked. In the aspects of the invention wherein the inner particulate material comprises a polymer, the molecular weight of the latex copolymer composition is based on both the inner particulate and outer copolymer.

The glass transition temperature of the latex copolymers of the present invention is typically in the range of −80 to 90° C., preferably −70 to 30° C., which can be achieved by the appropriate combination of the comonomers involved in the copolymerization as known to those skilled in the art. The Tg of the latex copolymers of the present invention used in paint applications is typically from about −15 to 20° C., preferably from about −10 to 10° C. and more preferably from about 0 to 5° C. In the case of pressure sensitive adhesives ("PSAs"), the Tg of the latex copolymers of the present invention is typically from about −60 to −5° C., preferably from about −45 to −15° C. and more preferably from about −40 to −30° C. As used herein, the term "Tg" means copolymer glass transition temperature. Techniques for measuring the glass transition temperature of copolymers are known to those skilled in the art. One such technique is, for example, differential scanning calorimetry. A particularly useful means of estimating the glass transition temperature of a copolymer is that given by the Fox equation, $$1/Tg_{(copolymer)} = x_1/Tg_1 + x_2/Tg_2 + x_3/Tg_3 + \ldots + x_n/Tg_n \quad (1)$$

where $x_i$ is the weight fraction of component in the copolymer and $Tg_i$ is the homocopolymer glass transition temperature of component i. For the preferred monomers of this invention these homopolymer glass transition temperatures are: vinyl acetate=32° C., butyl acrylate=−54° C., vinyl neodecanoate=−3° C., vinyl neo-nonanoate=60° C., vinyl neo-pentanoate=86° C., vinyl 2-ethylhexanoate=−50° C., vinyl propionate=10° C. and ethylene=−125° C.

The latex copolymers of the present invention are typically in colloidal form, i.e., aqueous dispersions, and can be prepared by emulsion polymerization in the presence of a chain transfer agent and an initiator. The processes for preparing the compositions of the present invention are not critical and may be batch, semi-continuous or continuous. Specific details concerning procedures and conditions for emulsion polymerization are known to those skilled in the art. Typically, however, the polymerization is carried out in an aqueous medium at a temperature of from about 20 to 120° C.

A chain transfer agent is preferably present during the polymerization reaction at a concentration of from about 0.01 to 5 weight percent, preferably from about 0.1 to 1 weight percent based on the total monomer content. Both water-insoluble and water-soluble chain transfer agents can be employed. Illustrative of substantially water-soluble chain transfer agents are alkyl and aryl mercaptans such as butyl mercaptan, mercaptoacetic acid, mercaptoethanol, 3-mercaptol-1,2-propanediol and 2-methyl-2-propanethiol. Illustrative of the substantially water-insoluble chain transfer agents include, for example, t-dodecyl mercaptan, phenyl mercaptan, pentaerythritol tetramercaptopropionate, octyldecyl mercaptan, tetradecyl mercaptan and 2-ethylhexyl-3-mercaptopropionate.

In carrying out the emulsion polymerization, an initiator (also referred to in the art as a catalyst) is preferably used at a concentration sufficient to catalyze the polymerization reaction. This will typically vary from about 0.01 to 3 weight percent based on the weight of monomers charged. However, the concentration of initiator is preferably from about 0.05 to 2 weight percent and, most preferably, from about 0.1 to 1 weight percent of the monomers charged. The particular concentration used in any instance will depend upon the specific monomer mixture undergoing reaction and the specific initiator employed, which details are known to those skilled in the art. Illustrative of suitable initiators include hydrogen peroxide, peracetic acid, t-butyl hydroperoxide, di-t-butyl hydroperoxide, dibenzoyl peroxide, benzoyl hydroperoxide, 2,4-dicholorbenzoyl peroxide, 2,5-dimethyl-2,5-bis(hydroperoxy) hexane, perbenzoic acid, t-butyl peroxypivalate, t-butyl peracetate, dilauroyl peroxide, dicapryloyl peroxide, distearoyl peroxide, dibenzoyl peroxide, diisopropyl peroxydicarbonate, didecyl peroxydicarbonate, dicicosyl peroxydicarbonate, di-t-butyl perbenzoate, 2,2'-azobis-2,4-dimethylvaleronitrile, ammonium persulfate, potassium persulfate, sodium persulfate, sodium perphosphate, azobisisobutyronitrile, as well as any of the other known initiators. Also useful are the redox catalyst systems such as sodium persulfate-sodium formaldehyde sulfoxylate, cumene hydroperoxide-sodium metabisulfite, hydrogen peroxide-ascorbic acid, and other known redox systems. Moreover, as known by those skilled in the art, traces of metal ions can be added as activators to improve the rate of polymerization, if desired. Quite surprisingly, it has been found that excess amounts of reducer, e.g., sodium formaldehyde sulfoxylate, relative to oxidizer, e.g., t-butyl hydroperoxide, e.g., 2:1, preferably at least 3:1 (molar ratio) can enhance alkene incorporation.

The particular surfactant useful for conducting the polymerization reaction is not critical to the present invention. Typical surfactants include anionic surfactants such as sodium lauryl sulfate, sodium tridecylether sulfate, diester sulfosuccinates and sodium salts of alkyl aryl polyether sulfonates; and nonionic surfactants such as alkyl aryl polyether alcohols and ethylene oxide condensates of propylene oxide, propylene glycol adducts.

The reaction products comprising the latex copolymers of the present invention typically have a solids, i.e., copolymer, content of from about 25 to 75 weight percent, preferably from about 45 to 65 weight percent and more preferably from about 50 to 60 weight percent based on the weight of the latex (both inner particulate material and outer copolymers) and water. Typically, the particle size of the latex copolymer is from about 0.1 to 1.0 microns, preferably from about 0.2 to 0.5 microns and more preferably from about 0.25 to 0.35 microns for coatings, and more preferably from about 0.15 to 0.35 microns for PSAs.

Quite surprisingly, the present invention facilitates the incorporation of significant amounts of alkenes, e.g., ethylene, into the latex copolymer compositions at lower pressures than typically employed in ethylene latex polymerizations, e.g., typical latex polymerization processes utilizing ethylene which operate at pressures of 5.5 up to about 18 MPa. Typical pressures in accordance with the present invention are from about 0.1 to 14, preferably from about 0.3 to 10, more preferably from about 0.7 to 7 and most preferably from about 1 to 4 MPa.

The apparatus utilized to conduct the polymerization is not critical to the present invention and may include reactors such as, continuous stirred tank reactors, plug flow reactors, wet bed fluidized reactors with agitator and loop reactors. The details of suitable apparatus are known to those skilled in the art.

In one aspect of the invention, the monomers are subject to agitation, e.g., mixing with an impeller, in an aqueous medium. Preferably the alkene monomer, e.g., ethylene, is introduced to the reaction zone at the point of mixing. Hollow shaft agitators are particularly preferred for use in accordance with the present invention and are commercially available, e.g., hollow shaft agitator from Autoclave Engineers Group, Erie, Pa. In addition, the speed of mixing has been found to affect the amount of alkene incorporated into the copolymer composition. Typically, the speed of mixing is at least about 100 revolutions per minute ("rpm"), preferably from about 400 to 1000 rpm, and more preferably from about 600 to 2000 rpm. In the case of the wet bed fluidized reactor with agitator, additional mixing can be effected by the flow of the vapor monomer upward through the wet bed fluidized reactor. Further details concerning fluidized bed operation are known to those skilled in the art.

Preferably, the polymerization is conducted in the presence of the inner particulate material which is introduced to the reaction zone either before the reaction is commenced or continuously or intermittently during the polymerization reaction. The amount of inner particulate material introduced to the reaction zone, and the manner in which it is introduced, can affect the particle size and particle size distribution of the resulting latex copolymer, especially in the continuous emulsion polymerization mode, the details of which can be determined by simple experimentation.

In another aspect of the invention, the liquid monomers are introduced in a manner effective to enhance the incorporation of the alkene monomer, e.g., ethylene, into the latex composition. This can be accomplished by providing separate and distinct monomer mixtures to feed during the polymerization (known in the art as "staged feed") or by varying the rates of monomer addition during the polymerization (known in the art as "power feed"). Preferably, the rates of addition are varied to provide molar ratios of the first liquid monomer, e.g., vinyl acetate, to the second liquid monomer, e.g., vinyl neodecanoate of from about 0.01–1.0 to 100–1.0. This type of operation can be conveniently conducted by providing a monomer holding zone containing the second liquid monomer and then introducing the first liquid monomer to the holding zone while withdrawing a liquid effluent stream from the holding zone which comprises the first liquid monomer and the second liquid monomer. The relative concentration of the monomers in the holding zone and the effluent stream thereby vary depending on the rate of introduction of the first liquid monomer and the withdrawal of the effluent stream. This mode of operation can be used to provide the desired characteristics in the final latex copolymer composition. Further details concerning this type of operation are disclosed, for example, in U.S. Pat. Nos. 3,804,881 and 4,039,500.

The above described aspects of the present invention may be conducted in combination with each other or independently. In addition, a process during which the monomers can all be charged in the reactor at the start of the polymerizations, i.e., a batch process as opposed to semicontinuous (delayed) addition can also be employed.

The latex compositions of the present invention can have a variety of end uses including, for example, as protective or decorative coatings, e.g., latex paints, adhesives, e.g., PSA's, and personal care applications, e.g., hair fixatives. Other potential applications include, for example, caulks and sealants, paper coatings, masonry additives, leather applications, textiles, as additives to improve the flow of crude oil and middle distillates, in corrosion-resistant primer coatings for metals, adhesives for hard-to-adhere surfaces, such as plastics, e.g., polypropylene and polyvinyl chloride, and in water-proofing coatings for concrete, wood, tile, brick and metal.

A preferred end use application for the latex compositions of the present invention is in a latex paint. Typically, the amount of latex compositions in the latex paint, is at least about 1, preferably about 2 to 50 and most preferably about 3 to 40 weight percent of the total paint composition. The latex paint may also contain from about 20 to 90 weight percent water and from about 0.1 to 10 weight percent of other additives including for example, thickeners, pigments, preservatives, surfactants, dispersants and the like. Typical components include, but are not limited to, one or more of the following: solvents such as aliphatic or aromatic hydrocarbons, alcohols, esters, ketones, glycols, glycol ethers, nitroparaffins or the like; pigments; fillers, dryers, flatting agents; plasticizers; stabilizers; dispersants; surfactants; viscosifiers including other polymeric additives, cellulose ether based thickeners and so on; suspension agents; flow control agents; defoamers; anti-skinning agents; preservatives; extenders; filming aids; other crosslinkers; surface improvers; corrosion inhibitors; and other ingredients useful in latex compositions. Further details concerning the preparation of latex paints are known to those skilled in the art.

Quite surprisingly, in accordance with the present invention films made from the latex compositions can have enhanced scrub resistance relative to films made from copolymers which do not comprise the ethylene or branched vinyl ester monomer. As used herein, the term "scrub resistance" means wet abrasion resistance as measured by ASTM D2486-79.

Another preferred end use for the latex compositions of the present invention is as a pressure sensitive adhesive. PSAs are soft ductile materials which in the dry state are permanently tacky at room temperature and adhere to a variety of surfaces under only slight pressure. They have low glass transition temperature (Tg) less than −20° C. and low to medium molecular weight. These are being increasingly used in consumer, automotive and construction areas. PSAs are generally polymers derived from acrylic, vinyl acetate, ethylene, styrene, butadiene and isoprene type of monomers. In many cases, depending on the nature of base copolymer they are formulated with tackifiers, plasticizers, and curing agents to enhance adhesive properties. Water-borne systems are modified with surfactants, defoamers, rheology modifiers to enhance application properties. A typical PSA end-use system consists of the adhesive, the carrier (polymeric or metallic film or paper backing) and, in many cases, silicone release liner. They find applications in tapes, labels, decals, floor tiles, wall coverings and wood grained film.

A typical PSA composition in accordance with the present invention, comprises from about 75 to 100 weight percent of the latex copolymer composition, and from about 0 to 25 weight percent of other common ingredients, based on the total weight of the adhesive composition. Other common ingredients found in adhesive compositions include for example, surfactants, defoamers, tackifiers, pigments, plasticizers, etc. Further details concerning the preparation of adhesive compositions are known to those skilled in the art.

The following examples are provided for illustrative purposes and are not intended to limit the scope of the claims which follow. Weights are given in grams ("g") and percentages are given as weight percent unless otherwise stated.

The following ingredients were used in the Examples which follow.

| INGREDIENT | DESCRIPTION |
| --- | --- |
| Nalco 2343 | a defoamer, available from Nalco Chemical, Naperville, IL |
| Rhodacal DS-4 | sodium dodecyl benzene sulfonate, available from Rhone Poulenc, Cranbury, NJ. |
| Sodium Vinyl Sulfate ("SVS") | sodium salt of ethylene sulfonic acid available from Air Products & Chemicals, Allentown, PA. |
| Tergitol NP-15 | nonyl phenol ethoxylate available from Union Carbide Corporation, Danbury, CT. |
| Airflex 400 | commercial latex copolymer containing ethylene available from Air Products & Chemicals, Allentown, PA. |
| Vinamul 3692 | commercial latex copolymer containing ethylene available from Vinamul Limited, Surrey, England. |
| Wallpol EM-2560 | commercial latex copolymer containing ethylene available from Reichold Chemicals, Inc., Research Triangle Park, NC. |
| Vinamul ICE | commercial latex copolymer containing ethylene available from Vinamul Limited, Surrey, England. |
| Cellosize™ QP-300 | hydroxyethyl cellulose having a molecular weight of about 300,000 g/g-mole, available from Union Carbide Corporation, Danbury, CT |
| Cellosize™ QP-15000H | hydroxyethyl cellulose having a molecular weight of about 600,000 |

-continued

| INGREDIENT | DESCRIPTION |
| --- | --- |
| | g/g-mole, available from Union Carbide Corporation, Danbury, CT. |
| UCAR™ Latex 300 | commercial latex copolymer available from Union Carbide Corporation, Danbury, CT |
| Rovace SF-091 | commercial latex copolymer available from Rhom & Haas Company, Philadelphia, PA |
| Airflex 809 | commercial latex copolymer containing ethylene available from Air Products & Chemicals, Allentown, PA |
| UCAR™ 379G | commercial latex copolymer available from Union Carbide Corporation, Danbury, CT |
| Polyphobe™ 116 | commercial rheology-modifier latex available from Union Carbide Corporation, Danbury, CT |

The following tests were used to characterize the latexes in the paint formulations.

The scrub resistance test is conducted in accordance with ASTM D2486-79. It is designed to test the integrity (scrub resistance) of a paint film. Drawdowns of the test paint and the control on the same Leneta plastic charts were made using a 7 mil drawdown bar. The films are made in the direction parallel to the length of the chart. The drawdowns were air-dried at constant room temperature and humidity for 7 days. Following this conditioning of the films, the Leneta chart was placed in a Gardner Straight Line Washability and Wear Abrasion Machine. Two metal shims were placed underneath the Leneta chart and 7 ml of scrum-media and 5 milliliters ("ml") of water were then placed on each brush and the test starts. The test was stopped when a film failed. A failure is defined as the appearance of one continuous line across the film due to the erosion of the coating. The number of cycles necessary for failure to occur was reported.

The viscosity of the paints was measured using the Stormer Viscometer. The measurement reflects the consistency of the paint. The experiment consists of measuring the load required to produce a rotational frequency of 200-rpm for an off-set paddle rotor immersed in the paint. The Krebs Units ("KU") are the values of a scale commonly used to express the consistency of paints generally applied by brush or roller. This scale is a log function of the "load to produce 200-rpm".

EXAMPLE 1

PREPARATION OF LATEX

Latex copolymers of vinyl acetate, ethylene and vinyl neo-decanoate were prepared according to the formula and procedure given below. All amounts refer to the solids content, exclusive of carriers unless otherwise stated.

| Ingredient | grams |
| --- | --- |
| Monomer mix | |
| vinyl acetate | 5712 |

-continued

| Ingredient | grams |
|---|---|
| vinyl neo-decanoate | 1428 |
| Nalco 2343 | 34 |
| Initial Monomer | |
| Ethylene | charge to desired pressure |
| Initial charge | |
| D.I. Water | 4700.0 |
| Cellosize QP-300 | 37.49 |
| Sodium Acetate | 14.35 |
| Rhodacal DS-4 | 156.22 |
| Tergitol NP-15 | 164.77 |
| Ferrous Sulfate | 0.07 |
| Nalco 2343 | 6.76 |
| Sodium Vinyl Sulfonate | 28.84 |
| Water Rinse | 280.0 |
| Initial Catalyst | |
| deionized water | 100.0 |
| ammonium persulfate | 9.12 |
| Initial Reducer | |
| deionized water | 50.0 |
| sodium metabisulfite | 9.2 |
| Fed Catalyst | |
| deionized water | 820.0 |
| ammonium persulfate | 25.68 |
| Fed Reducer | |
| deionized water | 832.8 |
| sodium metabisulfite | 12.84 |
| Post Heat: At 70° C. for 30 minutes | |
| Post additions | |
| Post-Catalyst-Oxidizer | |
| deionized water | 272 |
| t-butyl hydroperoxide (70%) | 13.65 |
| Post-Catalyst-Reducer | |
| deionized water | 275 |
| Sodium Metabisulfite | 7.44 |
| Polymerization Temperature: 72° C. | |
| Feed Time: 3 hours | |

The monomer mixture was prepared by charging the appropriate amount of each of the above monomers to a stainless steel monomer mix tank ("MMT"), and mixing the contents using a variable speed agitator. The initial charge was added to a 5-gallon stainless steel reactor equipped with a DISPERSIMAX™ hollow-shaft, stainless steel double disk turbine impeller obtained from Autoclave Engineers Group, Erie, Pa. Two 5-gallon stainless steel reactors were employed for the polymerizations in these examples. These were geometrically similar and are capable of maximum allowable working pressures of 600 pounds per square inch gauge ("psig") and 1400 psig, respectively.

The temperature desired for the polymerization was achieved by adjusting the temperature set point in a thermostated water bath. Initially, the reactor was evacuated to −10 psig and it was then pressurized to 10 psig using ethylene. A hold period of 5 minutes was employed after which the reactor was vented. Following this conditioning of the reactor, the agitator speed was set to the desired setting, usually 600 rpm unless otherwise noted, and the initial liquid phase monomer was added to the reactor followed by the addition of ethylene to the reactor until the desired pressure level was achieved. Once the reactor pressure reached the desired level, a solubilization step was followed, i.e., ethylene was allowed to solubilize in the initial monomer charge. As a result, the reactor pressure dropped below the desired setting and, therefore, more ethylene was allowed into the reactor until the pressure reached the desired level. This step was repeated until essentially no more ethylene solubilized in the liquid phase.

Once the solubilization step was completed, the initial initiator was added to the reactor followed by the initial reducer. The reactor temperature increased as a result of the exotherm due to the polymerization of the initial charge. After the exotherm, the reactor contents were allowed to react further in the absence of any additional monomer for a time period of about 30 minutes. Following this, an ethylene valve on the reactor was opened and ethylene was allowed to vent from the reactor until the desired pressure level was reached. With the reactor pressure at the desired level and the ethylene feed cylinder valve open, the liquid monomer, the fed catalyst and the fed reducer feeds were all commenced at the same time.

The polymerization time, temperature and pressure are operating variables and were adjusted depending on the desired values. Different levels of the initial and fed initiator and the initial and fed reducer were also used. When all the feeds were finished, the reactor contents were allowed to further react for a period of time that ranged from about 30 to 60 minutes in order to facilitate residual monomer reduction. After this post-heat step, the post-catalysis step was started. Post-oxidizer and post reducer solutions were fed over a period of time in order to ascertain that residual monomer levels were within desired limits. After the post-catalysis was completed, the reactor was cooled to below 30° C. When the residual monomer levels were within desired limits, the product was transferred to a 15 gallon drum.

Table 3 lists typical properties of the copolymers made by the procedure described above.

TABLE 3

Copolymers of Ethylene

| Composition, wt % | | | | |
|---|---|---|---|---|
| Ethylene (NMR) | Vinyl Acetate* | Vinyl Neodecanoate* | Pressure (psig) | Polydispersity (particle size) |
| 12.9 | 69.7 | 17.4 | 435 | 1.20 |
| 10.1 | 80.9 | 9.0 | 435 | 1.31 |
| 12.5 | 61.3 | 26.2 | 435 | 1.29 |
| 11.6 | 79.6 | 8.8 | 435 | 1.23 |
| 13.9 | 60.3 | 25.8 | 435 | 1.35 |
| 17.0 | 66.4 | 16.6 | 785 | 1.26 |
| 21.4 | 55.0 | 23.6 | 1135 | 2.65 |
| 20.5 | 55.6 | 23.9 | 1135 | 1.92 |

*by feed ratio

The ethylene concentration was determined by nuclear magnetic resonance spectroscopy ("NMR"). The concentration of the remaining monomers was determined by difference from the ethylene concentration and the feed ratios. Otherwise, the amounts of ethylene (or other alkene) were calculated based on the amount of ethylene consumed the feed(s) addition. Such ethylene contents, therefor, the lowest ethylene content since no account was taken of the ethylene consumed during the initiation stage. In line with the estimation of the ethylene content as outlined above, no account is taken of the ethylene used to pressurize the reactor or the ethylene released before recovering the product.

Table 4 shows the effect of agitation on ethylene incorporation.

TABLE 4

Effect of Agitation on Ethylene Incorporation

| Agitation, rpm | Ethylene Uptake, g |
|---|---|
| At 435 psig | |
| 400 | 246 |
| 600 | 643 |
| At 250 psig | |
| 400 | 115 |
| 600 | 614 |
| 1000 | 712 |

The ethylene uptake was determined by measuring the weight of ethylene fed during the reaction. The results in Table 4 indicate that the effect of agitation on ethylene uptake is significant at the low pressures employed in this invention. It is believed that because of the low pressures employed in this invention, agitation is a critical variable in affecting ethylene copolymerization. Ethylene uptake increased by 160% when the agitation increased from 400 rpm to 600 rpm. Table 4 also indicates that more ethylene was incorporated into the copolymer at 250 psig than at 435 psig when the agitation was higher at 250 psig than it was at 435 psig. More specifically, the ehtylene uptake at a pressure of 250 psig was 712 grams when an agitation of 1000 rpm was used but it was 643 grams at a pressure of 435 psig and agitation of 600 rpm.

The effect of mixing on ethylene uptake was also determined diameter hollow shaft agitators. Table 5 shows that ethylene uptake during the polymerization increased with increasing impeller diameter.

TABLE 5

Effect of Diameter of Hollow Shaft Agitator
At 250 psig & 600 rpm

| Diameter, inches | Ethylene Uptake, g |
|---|---|
| 3 | 208 |
| 4 | 323 |
| 5 | 401 |

With a 4 inch diameter impeller, the ethylene uptake during polymerization was 55% higher than it was with a 3 inch diameter impeller. With a 5 inch diameter impeller, ethylene uptake was 24% higher than it was for the 4 inch impeller. Table 6 shows that with the hollow shaft agitator, ethylene uptake during the polymerization was 35% higher than it was when a regular, i.e., solid shaft, agitator was used with a blade diameter equal to that of the hollow shaft agitator.

TABLE 6

Effect of Agitator Configuration
At 250 psig & 600 rpm

| Agitator | Ethylene Uptake, g |
|---|---|
| Solid Agitator | 296 |
| Hollow Shaft Agitator | 401 |

The results in Table 7 indicate that at low reaction pressures, e.g., 4 MPa, ethylene incorporation was enhanced in the presence of a branched ester.

TABLE 7

Effect of Vinyl neo-decanoate on Ethylene Incorporation

| | Ethylene Content, wt % (NMR) |
|---|---|
| At 290 psi vinyl acetate/vinyl neo-decanoate (weight ratio) | |
| 100/0 | 7.1 |
| 90/10 | 8.3 |
| 85/15 | 9.3 |
| At 435 psig | |
| 90/10 | 10.1 |
| 80/20 | 13.1 |
| 70/30 | 12.5 |
| At 1100 psig | |
| 100/0 | 19.3 |
| 90/10 | 18.1 |
| 85/15 | 18.0 |
| 80/20 | 18.8 |
| 70/30 | 20.5 |
| 60/40 | 20.5 |

Table 7 shows that ethylene incorporation was significantly enhanced in the presence of the branched ester at pressures of 290 psig and 435 psig. At higher pressures, e.g., 1100 psig, the presence of the branched ester did not appear to have a significant effect on ethylene incorporation.

Table 8 shows the results of ethylene uptake for polymerizations using vinyl neo-nonanoate, vinyl neo-dodecanoate, a 50/50 by weight mixture of both, and vinyl neo-decanoate.

TABLE 8

Effect of Branched Esters
on Ethylene Incorporation
At 250 psig

| Liquid Monomer Composition (weight/ratio) | Ethylene Uptake, g |
|---|---|
| Vinyl Acetate/Vinyl neo-nonanoate: 80/20 | 591 |
| Vinyl Acetate/Vinyl neo-dodecanoate: 80/20 | 664 |
| Vinyl Acetate/Vinyl neo-nonanoate/Vinyl neo-dodecanoate: 80/10/10 | 577 |
| Vinyl Acetate/Vinyl neo-decanoate: 80/20 | 614 |

The results indicate that ethylene uptake increased as the number of carbon atoms in the acid moiety of the branched ester increased, viz., higher ethylene uptake for vinyl neo-decanoate than for vinyl neo-nonanoate. The ethylene uptake was higher for vinyl neo-dodecanoate.

Because of the beneficial effect of the branched ester on ethylene incorporation at lower pressures, additional polymerizations were carried out at lower pressures. At 50 psig, the ethylene content of about 3 wt % a polymer prepared in accordance with this invention was higher than the ethylene content of 2.6% for an ethylene-vinyl acetate polymer made at a pressure of 290 psig in the absence of a branched ester as reported in EPA 0 295 727 A2.

EXAMPLE 2

PREPARATION OF LATEX WITH INNER PARTICULATE MATERIAL

Latex copolymers of vinyl acetate, ethylene and vinyl neodecanoate were prepared according to the procedure set forth in Example 1 and the formula given below containing a polystyrene latex as an inner particulate material except as otherwise noted.

| Ingredient | Grams | |
|---|---|---|
| Monomer Mix | | |
| Water | 1449 | |
| Nalco 2343 | 40.76 | |
| SVS | 28.84 | |
| Rhodacal DS-4 | 156.22 | |
| Tergitol NP-15 | 164.77 | |
| Vinyl Acetate | 5712 | |
| Vinyl neo-decanoate | 1428 | |
| Reactor Charge | | |
| D.I. Water | 3251.80 | |
| Cellosize QP-300 | 0.00 | |
| Ferrous Sulfate | 0.07 | make in 50 g water |
| Sodium Acetate | 14.35 | |
| polystyrene latex | 92.90 | |
| Water Rinse | 280 | |
| Fed Catalyst | | |
| D.I. Water | 870 | |
| Ammonium Persulfate | 34.74 | |
| Fed Reducer | | |
| D.I. Water | 883 | |
| Sodium Metabisulfite | 22.04 | |
| Post-Heat | | |
| At 70° C. for 30 minutes | | |
| Post Additions | | |
| Post Catalyst-Oxidizer | | |
| t-Butyl Hydroperoxide | 13.65 | |
| Water | 272 | |
| Post Catalyst-Reducer | | |
| Sodium Metabisulfite | 7.44 | |
| Water | 275 | |
| Polymerization Temp. 72° C. | | |
| Feeds Time: 3 hrs | | |

Table 9 lists typical properties of the copolymers made by this example.

TABLE 9

Copolymers of Ethylene

| Composition, wt % | | | | | Poly- |
|---|---|---|---|---|---|
| Ethylene (NMR) | Vinyl Acetate* | Vinyl Neodeca-noate* | Pressure (psig) | Polystyrene Particle Size (microns) | dispersity (particle size) |
| 15.1 | 67.9 | 17.0 | 435 | 0.025 | 1.11 |
| 7.7 | 73.8 | 18.5 | 250 | 0.05 | 1.08 |
| 8.2 | 73.4 | 18.4 | 250 | 0.025 | 1.11 |
| 8.6 | 73.1 | 18.3 | 250 | 0.03** | 1.13 |

*by feed ratio
**poly(vinyl neo-decanoate) was substituted for polystyrene

For the polymerizations at 250 psig, the second entry in Table 9 corresponds to a smaller particle size inner particulate material (0.025 microns) than the first entry (0.05 microns). The amount of the inner particulate material was adjusted so as to provide the same number of particles of the inner particulate material. Ethylene incorporation was higher for the smaller inner particulate material of the same composition than it was for the larger one. The last entry in Table 9 corresponds to a poly (vinyl neo-decanoate) inner particulate material and the ethylene uptake was the highest of those listed.

When conducting the polymerization using the inner particulate material, the preformed latex was introduced in the initial reactor charge to help increase the incorporation of ethylene in the final latex. In addition, the amount of inner particulate material (also referred to herein as seed latex) controlled the particle size of the final latex. Accordingly, as the seed latex amount increased, the final latex particle size decreased and as the seed latex amount decreased, the final latex particle size increased. The seed latex can be fed during the entire time required for the addition of the liquid monomer mixture or only during a portion of the time. In addition, high solids latexes can be obtained using two or more seed latex additions, e.g., one in the initial reactor charge and the second at some time during the polymerization. The resulting final latex would possess a bimodal particle size distribution leading, therefore, to latexes with high total solids content and low viscosity. Total solids contents as high as 80% or higher, for example, can be achieved. These additional seed latex charges during the polymerization can enhance ethylene incorporation. Any latex which can promote ethylene incorporation can be used as a seed in the seeded process disclosed herein. Suitable seed latexes can be readily determined by those skilled in the art.

Surprisingly, the latexes made by the process of Example 2 were very monodisperse. The particle size polydispersity indices for commercial vinyl acetate/ethylene polymers and for copolymers made by the processes disclosed in this invention are listed in Table 10.

TABLE 10

Comparison of Polydispersity Indices

| Ethylene-Containing Polymer | Polydispersity Index |
|---|---|
| Seeded Feed of Invention | 1.04 |
| Airflex 400 | 1.70 |
| Wallpol EM-2560 | 1.58 |
| Vinamul ICE | 1.88 |
| Vinamul 3692 | 1.78 |

The polydispersity index of the copolymers made by seeded polymerization according to this invention was 1.04 (weight-average particle size=0.2680 microns and number-average particle size=0.2585 microns) indicating a very highly monodisperse particle size distribution.

Table 11 compares the amounts of ethylene consumed during the duration of the feeds for examples of polymerization processes suitable for practicing this invention.

TABLE 11

Ethylene Content of Copolymers by NMR Analysis

| Process | Ethylene, wt % |
|---|---|
| Seeded Feed | 15.1 |
| Power Feed | 9.1 |
| Staged Feed | 10 |
| Example 1 | 12.9 |
| Seeded Feed at 80° C. | 17.9 |
| Liquid monomer composition: vinyl acetate/neo-decanoate/butyl acrylate: 79/19/2 | 13.6 |
| Liquid monomer composition: Vinyl acetate/neo-decanoate/2-ethyl hexyl acrylate: 79/19/2 | 11.2 |

Unless otherwise indicated, for these runs, the pressure was 435 psig, the temperature was 72° C. and the feed time was 3 hours. When the polymerization temperature increased to 80° C. for the seeded process, the ethylene uptake increased further to 17.9 wt %.

Quite surprisingly, the copolymer made when the seed latex was fed to the reactor as a mixture with the monomer had a gel content of 50%. Also, when the seed was omitted from the reaction the amount of ethylene incorporation decreased significantly. More specifically, at 145 psig, a copolymer made in accordance with the procedure of Example 3 had an ethylene content of 5.0 wt. %. Without the seed, a copolymer made in accordance with the procedure of Example 3 had an ethylene content of 3.0 wt. %. Thus, the Alkene Incorporation Enhancement was (5.0−3.0)/3.0 (100)=66%.

EXAMPLE 3

PREPARATION OF LATEX WITH VARYING FEED RATES

Latex copolymers of vinyl acetate, ethylene and vinyl neodecanoate were prepared according to the formula given below and procedure set forth in Example 1, except as otherwise noted. A power feed profile was employed.

| Ingredients | grams | |
|---|---|---|
| Reactor Charge | | |
| D.I. Water | 4700.00 | |
| Cellosize QP-300 | 37.49 | |
| Sodium Acetate | 14.35 | |
| Rhodacal DS-4 | 156.22 | |
| Tergitol NP-15 | 164.77 | |
| Ferrous Sulfate | 0.07 | (make in 50 g water) |
| Nalco 2343 | 6.76 | |
| SVS | 28.84 | |
| Water Rinse | 280 | |
| Initial Catalyst | | |
| Ammonium Persulfate | 9.12 | |
| D.I. Water | 100 | |
| Initial Reducer | | |
| Sodium Metabisulfite | 9.2 | |
| D.I. Water | 50 | |
| Initial Monomer | | |
| Vinyl Acetate | 443.5 | |
| Vinyl Neo-decanoate | 110.9 | |
| Nalco 2343 | 2.65 | |
| Total | 557 | |
| Monomer Mix Near Tank | | |
| Vinyl Acetate | 5268.5 | |
| Nalco 2343 | 31.35 | |
| Total | 5299.85 | |
| NearTank-to-Rx Feed Rate: 36.76 g/min | | |
| Monomer Mix Far Tank | | |
| Vinyl neo-decanoate | 1317.1 | |
| Total | 1317.1 | |
| Far tank-to-Near Tank Feed Rate: 7.32 g/min | | |
| Fed Catalyst | | |
| D.I. Water | 820 | |
| Ammonium Persulfate | 25.68 | |
| Fed Reducer | | |
| D.I. Water | 832.8 | |
| Sodium Metabisulfite | 12.84 | |
| Post-Heat At 70° C. for 30 minutes | | |
| Post Additions | | |
| Post Catalyst-Oxidizer | | |
| t-Butyl Hydroperoxide (70%) 13.65 | | |
| Water | 272 | |
| Post Catalyst-Reducer | | |
| Sodium Metabisulfite | 7.44 | |
| Water | 275 | |
| Polymerization Temp. 72° C. | | |
| Feeds Time: 3 hours | | |

Table 12 lists typical properties of a copolymer made by the process described above.

TABLE 12

Copolymer of Ethylene

| Composition, wt % | | | | |
|---|---|---|---|---|
| Ethylene (NMR) | Vinyl Acetate* | Vinyl Neo-decanoate* | Pressure (psig) | Polydispersity (particle size) |
| 9.1 | 72.7 | 18.2 | 435 | 1.27 |

*by feed ratio

EXAMPLE 4

PREPARATION OF LATEX WITH STAGED FEEDS

Latex copolymers of vinyl acetate, ethylene and vinyl neodecanoate were prepared according to the formula given below and procedures set forth in Example 1 except as otherwise noted. A staged feed profile was employed.

| Ingredient | grams |
|---|---|
| Monomer mix | |
| Stage 1 | |
| vinyl acetate | 5712 |
| Nalco 2343 | 34 |
| Stage 2 | |
| vinyl neo-decanoate | 1428 |
| Initial Monomer | varies |
| Ethylene | charge to desired pressure |
| Initial charge | |
| D.I. Water | 4700.0 |
| Cellosize QP-300 | 37.49 |
| Sodium Acetate | 14.35 |
| Rhodacal DS-4 | 156.22 |
| Tergitol NP-15 | 164.77 |
| Ferrous Sulfate | 0.07 |
| Nalco 2343 | 6.76 |
| Sodium Vinyl Sulfonate | 28.84 |
| Water Rinse | 280.0 |
| Initial Catalyst | |
| deionized water | 100.0 |
| ammonium persulfate | 9.12 |
| Initial Reducer | |
| deionized water | 50.0 |
| sodium metabisulfite | 9.2 |
| Fed Catalyst | |
| deionized water | 820.0 |
| ammonium persulfate | 25.68 |
| Fed Reducer | |
| deionized water | 832.8 |
| sodium metabisulfite | 12.84 |
| Post Heat: At 70° C. for 30 minutes | |
| Post additions | |
| Post-Catalyst-Oxidizer | |
| deionized water | 272 |
| t-butyl hydroperoxide (70%) | 13.65 |
| Post-Catalyst-Reducer | |
| deionized water | 275 |
| Sodium Metabisulfite | 7.44 |
| Polymerization temperature: 72° C. | |
| Feeds Time: 3 hours | |

Table 13 lists typical properties of the copolymers made by the process described above.

TABLE 13

Copolymers of Ethylene

| Composition, wt % | | | | |
|---|---|---|---|---|
| Ethylene (NMR) | Vinyl Acetate* | Vinyl Neo-decanoate* | Pressure (psig) | Polydispersity (particle size) |
| 10.0 | 72 | 18 | 435 | 1.28 |
| 11.0 | 71.2 | 17.8 | 435 | 1.23 |

*by feed ratio

The two entries in Table 13 refer to the staged processes of vinyl acetate/vinyl neo-decanoate:100/0//0/100 and 0/100//100/0, respectively.

EXAMPLE 5

PREPARATION OF LATEX

Latex copolymers of vinyl acetate, propylene and vinyl neodecanoate were prepared according to the formula given below and procedure set forth in Example 1, except as otherwise noted.

| Ingredient | grams |
|---|---|
| Monomer mix | |
| vinyl acetate | 5712 |
| vinyl neodecanoate | 1428 |
| Nalco 2343 | 34 |
| Initial Monomer | varies |
| Propylene | charge to desired pressure |
| Initial charge | |
| D.I. Water | 4700.0 |
| Cellosize QP-300 | 37.49 |
| Sodium Acetate | 14.35 |
| Rhodacal DS-4 | 156.22 |
| Tergitol NP-15 | 164.77 |
| Ferrous Sulfate | 0.07 |
| Nalco 2343 | 6.76 |
| Sodium Vinyl Sulfonate | 28.84 |
| Water Rinse | 280.0 |
| Initial Catalyst | |
| deionized water | 100.0 |
| ammonium persulfate | 9.12 |
| Initial Reducer | |
| deionized water | 75.0 |
| sodium metabisulfite | 9.2 |
| Fed Catalyst | |
| deionized water | 820.0 |
| ammonium persulfate | 38.5 |
| Fed Reducer | |
| deionized water | 832.8 |
| sodium metabisulfite | 19.3 |
| Post Heat: At 82° C. for 30 minutes | |
| Post additions | |
| Post-Catalyst-Oxidizer | |
| deionized water | 272 |
| t-butyl hydroperoxide (70%) | 27.3 |
| Post-Catalyst-Reducer | |
| deionized water | 275 |
| sodium metabisulfite | 14.9 |
| Polymerization Temperature: 82° C. | |

-continued

| Ingredient | grams |
|---|---|
| Feed Time: 3 hours | |

Table 14 lists typical properties of the copolymers made by the process described above. The propylene content was determined from the amount of propylene fed to the reactor during the polymerization.

TABLE 14

Copolymers of Propylene

| Composition, wt % | | | | |
|---|---|---|---|---|
| Propylene | Vinyl Acetate* | Vinyl Neo-decanoate* | Pressure (psig) | Polydispersity (particle size) |
| 18.4 | 65.3 | 16.3 | 435 | 3.97 |
| 8.3 | 73.4 | 18.3 | 145 | 1.77 |
| 4.0 | 76.8 | 19.2 | 50 | 1.90 |

*by feed ratio

EXAMPLE 6

PREPARATION AND TESTING OF LATEX

Latex copolymers of vinyl acetate, isobutylene and vinyl neodecanoate were prepared according to the formula given below and procedure set forth in Example 1, except as otherwise noted.

| Ingredient | grams |
|---|---|
| Monomer mix | |
| vinyl acetate | 5712 |
| vinyl neodecanoate | 1428 |
| Nalco 2343 | 34 |
| Initial Monomer | varies |
| Isobutylene | charge to desired pressure |
| Initial charge | |
| D.I. Water | 4700.0 |
| Cellosize QP-300 | 37.49 |
| Sodium Acetate | 14.35 |
| Rhodacal DS-4 | 156.22 |
| Tergitol NP-15 | 164.77 |
| Ferrous Sulfate | 0.07 |
| Nalco 2343 | 6.76 |
| Sodium Vinyl Sulfonate | 28.84 |
| Water Rinse | 280.0 |
| Initial Catalyst | |
| deionized water | 100.0 |
| t-butyl hydroperoxide (70%) | 27.4 |
| Initial Reducer | |
| deionized water | 75.0 |
| sodium formaldehyde sulfoxylate | 27.6 |
| Fed Catalyst | |
| deionized water | 770.0 |
| t-butyl hydroperoxide (70%) | 208.2 |
| Fed Reducer | |
| deionized water | 832.8 |
| sodium formaldehyde sulfoxylate | 57.9 |
| sodium acetate | 55 |

-continued

| Ingredient | grams |
|---|---|
| Post Heat: At 82° C. for 30 minutes | |
| Post additions | |
| Post-Catalyst-Oxidizer | |
| deionized water | 400 |
| t-butyl hydroperoxide (70%) | 82.2 |
| Post-Catalyst-Reducer | |
| deionized water | 400 |
| sodium formaldehyde sulfoxylate | 44.7 |
| Polymerization Temperature: 82° C. | |
| Feed Time: 3 hours | |

Table 15 lists typical properties of the copolymers made by the process described above. The isobutylene content was determined from the amount of isobutylene fed to the reactor during the polymerization.

TABLE 15

Copolymers of Isobutylene

| Composition, wt % | | | | |
|---|---|---|---|---|
| Isobutylene | Vinyl Acetate* | Vinyl Neo-decanoate* | Pressure (psig) | Polydispersity (particle size) |
| 12.8 | 69.8 | 17.4 | 145 | 2.15 |
| 9.5 | 72.4 | 18.1 | 50 | 1.70 |

*by feed ratio

EXAMPLE 7

PREPARATION OF LATEX

Latex copolymers of vinyl acetate, ethylene, propylene and vinyl neodecanoate were prepared according to the formula given below and procedure set forth in Example 1, except as otherwise noted.

| Ingredient | grams |
|---|---|
| Monomer mix | |
| vinyl acetate | 5712 |
| vinyl neodecanoate | 1428 |
| Nalco 2343 | 34 |
| Initial Monomer | varies |
| Propylene | charge to about half of desired pressure |
| Ethylene | charge after propylene to desired pressure |
| Initial charge | |
| D.I. Water | 4700.0 |
| Cellosize QP-300 | 37.49 |
| Sodium Acetate | 14.35 |
| Rhodacal DS-4 | 156.22 |
| Tergitol NP-15 | 164.77 |
| Ferrous Sulfate | 0.07 |
| Nalco 2343 | 6.76 |
| Sodium Vinyl Sulfonate | 28.84 |
| Water Rinse | 280.0 |
| Initial Catalyst | |
| deionized water | 100.0 |
| t-butyl hydroperoxide (70%) | 9.12 |

-continued

| Ingredient | grams |
|---|---|
| Initial Reducer | |
| deionized water | 75.0 |
| sodium formaldehyde sulfoxylate | 9.2 |
| Fed Catalyst | |
| deionized water | 770.0 |
| t-butyl hydroperoxide (70%) | 41 |
| Fed Reducer | |
| deionized water | 832.8 |
| sodium formaldehyde sulfoxylate | 19.3 |
| sodium acetate | 55 |
| Post Heat: At 70° C. for 30 minutes | |
| Post additions | |
| Post-Catalyst-Oxidizer | |
| deionized water | 272 |
| t-butyl hydroperoxide (70%) | 13.6 |
| Post-Catalyst-Reducer | |
| deionized water | 275 |
| sodium formaldehyde sulfoxylate | 7.44 |
| Polymerization Temperature: 72° C. | |
| Feed Time: 3 hours | |

Table 16 lists typical properties of the copolymers made by the process described above. The ethylene and propylene contents of the copolymer were determined from the amount of ethylene and propylene fed to the reactor during the polymerization.

TABLE 16

Copolymer of Ethylene, Propylene, Vinyl Acetate and Vinyl Neo-decanoate

| Composition, wt % | | | | | Ethylene | |
|---|---|---|---|---|---|---|
| Ethylene | Propylene | Vinyl Acetate* | Vinyl Neo-decanoate* | Pressure (psig) | concentration, wt % | Polydispersity (particle size) |
| 1.8 | 3.1 | 76.1 | 19.0 | 145 | 1.8 | 1.51 |

*by feed ratio

EXAMPLE 8

PREPARATION OF LATEX

Latex copolymers of vinyl acetate, butene-1 and vinyl neodecanoate were prepared according to the formula given below and procedure set forth in Example 1, except as otherwise noted.

| Ingredient | grams |
|---|---|
| Monomer mix | |
| vinyl acetate | 5712 |
| vinyl neodecanoate | 1428 |
| Nalco 2343 | 34 |
| Initial Monomer | varies |
| Butene-1 | charge to desired pressure |
| Initial charge | |
| D.I. Water | 4700.0 |
| Cellosize QP-300 | 37.49 |
| Sodium Acetate | 14.35 |
| Rhodacal DS-4 | 156.22 |
| Tergitol NP-15 | 164.77 |
| Ferrous Sulfate | 0.07 |
| Nalco 2343 | 6.76 |
| Sodium Vinyl Sulfonate | 28.84 |
| Water Rinse | 280.0 |
| Initial Catalyst | |
| deionized water | 100.0 |
| ammonium persulfate | 9.12 |
| Initial Reducer | |
| deionized water | 75.0 |
| sodium formaldehyde sulfoxylate | 9.2 |
| Fed Catalyst | |
| deionized water | 820.0 |
| ammonium persulfate | 25.68 |
| Fed Reducer | |
| deionized water | 832.8 |
| sodium metabisulfite | 12.84 |
| Post Heat: At 70° C. for 30 minutes | |
| Post additions | |
| Post-Catalyst-Oxidizer | |
| deionized water | 272 |
| t-butyl hydroperoxide (70%) | 13.65 |
| Post-Catalyst-Reducer | |
| deionized water | 275 |

-continued

| Ingredient | grams |
|---|---|
| Sodium Metabisulfite | 7.44 |
| Polymerization Temperature: 72° C. | |
| Feed Time: 3 hours | |

Table 17 lists typical properties of the copolymers made by the process described above. The butene-1 content was determined from the amount of butene-1 fed to the reactor during the polymerization.

TABLE 17

Copolymers of Butene-1

| | Composition by feed ratio, wt % | | Pressure (psig) | Polydispersity (particle size) |
|---|---|---|---|---|
| Butene-1 | Vinyl Acetate* | Vinyl Neo-decanoate* | | |
| 16.0 | 67.2 | 16.8 | 145 | 2.04 |

*by feed ratio

EXAMPLE 9

PREPARATION OF LATEX

Latex copolymers of vinyl acetate, hexene-1 and vinyl neodecanoate were prepared according to the formula given below and procedure set forth in Example 1, except as otherwise noted.

| Ingredient | grams |
|---|---|
| Monomer mix | |
| vinyl acetate | 5712 |
| vinyl neodecanoate | 1428 |
| Nalco 2343 | 34 |
| Initial Monomer | varies |
| Hexene-1 | charge to desired pressure using nitrogen, if necessary |
| Initial charge | |
| D.I. Water | 4700.0 |
| Cellosize QP-300 | 37.49 |
| Sodium Acetate | 14.35 |
| Rhodacal DS-4 | 156.22 |
| Tergitol NP-15 | 164.77 |
| Ferrous Sulfate | 0.07 |
| Nalco 2343 | 6.76 |
| Sodium Vinyl Sulfonate | 28.84 |
| Water Rinse | 280.0 |
| Initial Catalyst | |
| deionized water | 100.0 |
| ammonium persulfate | 9.12 |
| Initial Reducer | |
| deionized water | 50.0 |
| sodium formaldehyde sulfoxylate | 9.2 |
| Fed Catalyst | |
| deionized water | 820.0 |
| ammonium persulfate | 25.68 |
| Fed Reducer | |
| deionized water | 832.8 |
| sodium metabisulfite | 12.84 |
| Post Heat: At 70° C. for 30 minutes | |
| Post additions | |
| Post-Catalyst-Oxidizer | |
| deionized water | 272 |
| t-butyl hydroperoxide (70%) | 13.65 |

| Ingredient | grams |
|---|---|
| Post-Catalyst-Reducer | |
| deionized water | 275 |
| Sodium Metabisulfite | 7.44 |
| Polymerization Temperature: 72° C. | |
| Feed Time: 3 hours | |

Table 18 lists typical properties of the copolymers made by the process described above. The hexene-1 content was determined from the amount of hexene-1 fed to the reactor during the polymerization.

TABLE 18

Copolymer of Hexene-1

| | Composition by feed ratio, wt % | | Pressure (psig) | Polydispersity (particle size) |
|---|---|---|---|---|
| Hexene-1 | Vinyl Acetate* | Vinyl Neo-decanoate* | | |
| 11.4 | 70.9 | 17.7 | 145 | 2.31 |

*by feed ratio

EXAMPLE 10

LATEX COATINGS

Some of the latexes described above were tested for their use in coatings. Two 53% pigment volume concentration ("PVC") standard paint formulation known to those skilled in the art were used. Latex #18, prepared substantially in accordance with Example 1, and Latex #43, prepared substantially in accordance with Example 1, are two of the copolymers of the present invention. In addition to these two copolymers, commercial ethylene-containing copolymers were also tested. These included conventional copolymers UCAR™ 300, UCAR™ 379G, Rovace SF-091, Airflex 809, Vinamul 3692, Vinamul ICE, and Wallpol EM-2560. A Polyphobe™ thickener system and a urethane thickener system were used in the paints.

In the Polyphobe™ thickener system shown in Table 19, Latex #18 exhibited excellent thickener efficiency compared to both conventional and other pressure copolymers. Latex#18 required less than a half the amount of Polyphobe™ 116 to develop a similar initial Stormer viscosity as the control.

TABLE 19

Paint Properties
(Polyphobe ™ 116 Thickener)

| Test Scrub Resistance | Rovace SF-091 | Airflex 809 | Vinamul 3692 | Vinumil ICE | UCAR ™ 379G | Wallpol EM-2560 | LATEX #18 |
|---|---|---|---|---|---|---|---|
| test paint/control trial #1 | 733/1688 | 2768/1206 | 2605/1149 | 1186/1412 | 1002/1360 | 572/1830 | 1600/1375 |
| % Relative to control | 43 | 222 | 226 | 84 | 74 | 31 | 116 |
| test paint/control trial #2 | 690/1413 | 2419/1063 | 1929/859 | 984/1016 | 822/1270 | 489/1154 | 1486/1138 |
| % Relative to control | 48 | 227 | 224 | 96 | 65 | 42 | 129 |
| Avg. % relative to control | 45.5 | 224.5 | 225 | 90 | 69.5 | 36.5 | 122.5 |

In addition, the scrub resistance of Latex#18 was excellent. The scrub resistance of the Latex#18 was better than that of all the conventional latexes and of the Vinamul ICE and Wallpol EM-2560 copolymers. Only Airflex 809 and Vinamul 3692 possessed a better scrub resistance than Latex#18. However, these two pressure copolymers did not possess the high film clarity like the copolymers of this invention. Aiflex 809 and Vinamul 3692 both dried into a very hazy film. The other paint properties of the copolymers of this invention were similar to those of the other latexes. In the paint evaluation listed in Table 19, UCAR™ 300 with Polyphobe™ was used as the control.

Surprisingly, in the urethane system shown in Table 20, the scrub resistance of Latex#18 was excellent.

TABLE 20

Paint Properties
(Urethane Thickener)

| Test | | UCAR 300 | Rovace SF-091 | Airflex 809 | Vinamul 3692 | Vinumil ICE | UCAR ™ 379G | Wallpol EM-2563 | Latex #18 |
|---|---|---|---|---|---|---|---|---|---|
| Viscosity | Initial | 82 | 85 | 83 | 83 | 83 | 83 | 83 | 83 |
| Ku | 24 Hours | 92 | 93 | 90 | 93 | 94 | 99 | 93 | 98 |
| Scrub Resistance | Test Test paint/ Control | 1384/1503 | 639.5/1336 | 2922/1404.3 | 2226/1407.5 | 1138.7/1342.3 | 1545.7/1363 | 596/1527 | 2027/1310 |
| | % Relation to control | 92.08 | 47.87 | 208.10 | 158.15 | 84.83 | 113.40 | 39.03 | 154.70 |

It outperformed all other latexes except Airflex 809. The other paint properties of the copolymers of this invention were similar to those of the other latexes. In this paint evaluation listed in Table 20, UCAR™ 300 with Polyphobe™ 116 was the control.

The results of the paint property evaluation using Latex#43 are listed in Table 21.

TABLE 21

Paint Properties
(Cellosize QP-15000H Thickener)

| Test | Specifications/Tests | Airflex 809 | Vinamul 3692 | Latex #43 |
|---|---|---|---|---|
| Scrub Resistance Test 1 | Test Paint/Control | 3260/1430 | 6314/2703 | 5506/2450 |
| | % Relative to control | 228.0 | 234.0 | 225.0 |
| Scrub | Test Paint/Control | 2900/1420 | 10055/4559 | 6835/3208 |
| Resistance Test 2 | % Relative to control | 204.0 | 219.0 | 213.0 |
| Scrub Resistance Average | % Relative to control | 216.0 | 226.0 | 219.0 |

It can be seen that Latex#43 exhibited excellent scrub resistance. The scrub resistance of Latex#43 matched that of both Airflex 809 and Vinamul 3692. In the paint evaluation listed in Table 21, UCAR™ 300 was the control.

EXAMPLE 11

LATEX COATINGS

Some of the latexes described above were tested for their use in coatings. A 50% PVC. standard paint formulation known to those skilled in the art was used. Latex#3, a propylene-vinyl acetate-vinyl neodecanoate copolymer, prepared substantially in accordance with Example 5, Latex#2, an isobutylene-vinyl acetate-vinyl neodecanoate copolymer prepared substantially in accordance with Example 6, and Latex Mix#1, an ethylene-propylene-vinyl acetate-vinyl neodecanoate copolymer, prepared substantially in accordance with Example 7, were tested for their use in coatings. UCAR™ 300, a conventional copolymer, was used as the control. Both propylene and isobutylene copolymers and the ethylene-propylene-vinyl acetate-vinyl neodecanoate copolymer exhibited excellent freeze-thaw stability passing 5 freeze-thaw cycles. All three polymers exhibited very low scrub resistance compared to UCAR™ 300. The isobutylene copolymer exhibited 4% of the scrub resistance of UCAR™ 300, and the ethylene-propylene-vinyl acetate-vinyl neodecanoate copolymer exhibited 31% of the scrub resistance of UCAR™ 300.

EXAMPLE 12

REDUCER AND OXIDIZER LEVELS

Latex copolymers were prepared using a process similar to that described in Example 1, except that the theoretical total solids was raised to 54% at a constant total volume of final latex. The oxidizer/reducer system used was t-butyl hydroperoxide/sodium formaldehyde sulfoxylate. Table 22 lists the effect of reducer level, at constant oxidizer level, on ethylene incorporation during monomer feeds. Surprisingly, when the reducer level increased at a constant oxidizer level, ethylene incorporation during the polymerization increased rather dramatically. The ethylene uptake increased from 376 grams to 638 grams when the reducer/oxidizer ratio was increased from 0.5 to 3.0.

Table 23 lists the effect of oxidizer level, at constant reducer level, on ethylene incorporation during monomer feeds. Surprisingly, when the oxidizer level was increased at a constant reducer level, ethylene incorporation during the polymerization decreased. Ethylene incorporation decreased from 494 grams to 376 grams when the oxidizer/reducer ratio increased from 0.67 to 2.0.

TABLE 22

Effect of Reducer Level

| Reducer/Oxidizer | Ethylene Uptake, g |
| --- | --- |
| 0.5 | 376 |
| 3.0 | 638 |

TABLE 23

Effect of Oxidizer Level

| Oxidizer/Reducer | Ethylene Uptake, g |
| --- | --- |
| 2/3 | 494 |
| 2 | 376 |

Although the invention has been described with respect to those skilled in the art will recognize that other ended to be included within the scope of the claims which follow.

What is claimed is:

1. An alkene copolymer latex composition comprising,
   (i) an inner particulate material;
   (ii) an outer copolymer copolymerized from an alkene, a lower vinyl ester and optionally additional monomers, said outer copolymer at least partially encapsulating said inner particulate material; wherein the inner particulate material is effective to enhance the incorporation of the alkene into the copolymer composition; and
   (iii) water.
2. The composition of claim 1 wherein the inner particulate material is a non-polymer.
3. The composition of claim 2 wherein the inner particulate material comprises a catalyst for the polymerization of the alkene.
4. The composition of claim 3 wherein the catalyst is a heterogeneous catalyst.
5. The composition of claim 1 wherein the inner particulate material is a polymer.
6. The composition of claim 5 wherein the inner particulate material is polymerized from at least one monomer which comprises the outer copolymer.
7. The composition of claim 5 wherein the inner particulate material is selected from the group consisting of polystyrene, poly(vinyl acetate), poly(butyl acrylate), poly (methyl methacrylate), poly(vinyl neo-nonanoate), poly (vinyl neo-decanoate), poly (vinyl neo-endecanoate), poly (vinyl neo-dodecanoate), and copolymers or copolymers thereof.
8. The composition of claim 1 which comprises from about;
   (i) 0.01 to 5 weight percent of the inner particulate material; and
   (ii) 95 to 99.99 weight percent of the outer copolymer; said percentages based on the weight of the inner particulate material and the outer copolymer.
9. The composition of claim 1 wherein the additional monomers are selected from the group consisting of higher vinyl esters, vinyl aromatic hydrocarbons, vinyl aliphatic hydrocarbons, vinyl alkyl ethers, acrylic monomers, allylic monomers, and mixtures thereof.
10. The composition of claim 9 wherein the additional monomer is a branched vinyl ester monomer having from about 5 to 12 carbon atoms in the acid moiety.
11. The composition of claim 10 wherein the branched vinyl ester monomer is selected from the group consisting of vinyl pivalate, vinyl nonanoate, vinyl neodecanoate, vinyl neo-endecanoate, vinyl neo-dodecanoate, and mixtures thereof.
12. The composition of claim 1 wherein the Alkene Incorporation Enhancement is at least 10% compared to a polymerization conducted without said inner particulate material.
13. The composition of claim 1 having a particle size polydispersity index of from about 1.0 to 1.4.
14. The composition of claim 1 wherein the amount of the alkene is from about 0.5 to 95 weight percent based on the total weight of the outer copolymer.
15. The composition of claim 1 wherein the amount of the lower vinyl ester is from about 0.1 to 95 weight percent based on the total weight of the outer copolymer.
16. The composition of claim 1 wherein the amount of the additional monomers is from about 0.1 to 99.4 weight percent based on the total weight of the outer copolymer.
17. The composition of claim 1 wherein the alkene comprises from about 2 to 8 carbon atoms per molecule.
18. A film made from the composition of claim 1.
19. A process for preparing an alkene copolymer latex composition comprising:
   (i) introducing an inner particulate material to a reaction zone comprising an aqueous medium;
   (ii) introducing an alkene, a lower vinyl ester and optionally other monomers into the reaction zone under reaction conditions effective to promote the polymerization of the alkene and lower vinyl ester to at least partially encapsulate the inner particulate material; wherein the inner particulate material is effective to enhance the incorporation of the alkene into the composition.

20. The process of claim 19 wherein the reaction conditions include a temperature of from about 20 to 120° C.

21. The process of claim 19 wherein the reaction conditions include a pressure of from about 0.1 to 14 MPa.

22. The process of claim 19 further comprising adjusting the amount of inner particulate material introduced into the reaction zone relative to the amounts of the alkene, lower vinyl ester and other monomers in order to produce the alkene copolymer latex having a desired particle size.

23. The process of claim 19 comprising introducing a portion of the inner particulate material to the reaction zone after the polymerization has begun.

24. The process of claim 19 further comprising agitating the aqueous reaction medium.

25. The process of claim 24 comprising introducing the alkene at or near a point of agitation.

26. The process of claim 19 wherein the Alkene Incorporation Enhancement is at least 10% compared to a polymerization conducted without said inner particulate material.

27. The process of claim 19 further comprising introducing a reducer and an oxidizer unto the reaction zone to provide a molar ratio of the reducer to the oxidizer of at least about 3:1.

28. An alkene copolymer latex composition produced by the process of claim 19.

29. A process for preparing a latex copolymer polymerized from at least one vapor monomer, and at least a first liquid monomer and a second liquid monomer, comprising contacting said at least one vapor monomer with said first liquid monomer and said second liquid monomer in a reaction zone under reaction conditions effective to promote the formation of the copolymer; characterized in that during the formation of the copolymer, said first liquid monomer and said second liquid monomer are introduced into the reaction zone at rates which are varied in a manner effective to enhance the incorporation of said at least one vapor monomer into the copolymer.

30. The process of claim 29 wherein the vapor monomer is selected from the group consisting of ethylene, propylene, butylene, isobutylene, vinyl halides, 1,3-butadiene, methyl-2-butadiene, 2,3-dimethyl butadiene, cyclohexene, isoprene and cyclopentadiene.

31. The process of claim 30 wherein at least one of the first liquid monomer or the second liquid monomer is selected from the group consisting of higher vinyl esters, vinyl aromatic hydrocarbons, vinyl aliphatic hydrocarbons, vinyl alkyl ethers, acrylic monomers, allylic monomers, and mixtures thereof.

32. The process of claim 29 further comprising introducing an inner particulate material to the reaction zone prior to or during the formation of the copolymer.

33. The process of claim 29 wherein the rate of introduction of the first liquid monomer to the second liquid monomer is from about 0.01–1.0 to 100–1.0.

34. The process of claim 29 comprising introducing the first liquid monomer to a monomer holding zone containing the second liquid monomer, withdrawing a liquid effluent stream comprising the first liquid monomer and the second liquid monomer from the liquid holding zone and introducing the liquid effluent stream to the reaction zone.

35. A latex copolymer produced by the process of claim 29.

* * * * *